(12) United States Patent
He et al.

(10) Patent No.: US 12,557,030 B2
(45) Date of Patent: Feb. 17, 2026

(54) UPLINK POWER CONTROL FOR DUAL CONNECTIVITY

(71) Applicant: Apple Inc., Cupertino, CA (US)

(72) Inventors: Hong He, San Jose, CA (US); Dawei Zhang, Saratoga, CA (US); Jie Cui, San Jose, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 17/995,429

(22) PCT Filed: Apr. 8, 2021

(86) PCT No.: PCT/US2021/026448
§ 371 (c)(1),
(2) Date: Oct. 4, 2022

(87) PCT Pub. No.: WO2021/207539
PCT Pub. Date: Oct. 14, 2021

(65) Prior Publication Data
US 2023/0217373 A1  Jul. 6, 2023

Related U.S. Application Data

(60) Provisional application No. 63/007,079, filed on Apr. 8, 2020.

(51) Int. Cl.
*H04W 52/14* (2009.01)
*H04W 52/34* (2009.01)
*H04W 52/36* (2009.01)

(52) U.S. Cl.
CPC ....... *H04W 52/146* (2013.01); *H04W 52/346* (2013.01); *H04W 52/367* (2013.01)

(58) Field of Classification Search
CPC ..... H04W 52/14; H04W 52/34; H04W 52/36; H04W 52/146; H04W 52/346; H04W 52/367; H04L 1/0026; H04L 1/0029
See application file for complete search history.

(56) References Cited

U.S. PATENT DOCUMENTS 10,476,651 B2 * 11/2019 Zhang ............... H04W 72/23
10,531,397 B2 * 1/2020 Lim ................. H04W 52/146
(Continued)

FOREIGN PATENT DOCUMENTS

CN     110547001    12/2019
EP       3606191     2/2020
(Continued)

OTHER PUBLICATIONS

Huawei, HiSilicon, "UL power control for NR-NR dual connectivity", 3GPP TSG RAN WG1 Meeting #100-e, R1-2001039, Feb. 15, 2020, 3 sheets.

(Continued)

*Primary Examiner* — Hai V Nguyen
(74) *Attorney, Agent, or Firm* — Fay Kaplun & Marcin, LLP (57) ABSTRACT

A user equipment (UE) configured to perform uplink power control. The UE determines that a first uplink transmission is scheduled to overlap in time with a second uplink transmission based on a look ahead window, determines a first transmission power for the first uplink transmission, determines a second transmission power for the second uplink transmission based on the first transmission power for the first uplink transmission and performs the first uplink transmission and the second uplink transmission.

12 Claims, 8 Drawing Sheets

(56) References Cited

U.S. PATENT DOCUMENTS

| | | | | |
|---|---|---|---|---|
| 10,681,708 | B2* | 6/2020 | Li | H04L 5/0032 |
| 11,356,962 | B2* | 6/2022 | Hosseini | H04W 52/367 |
| 11,399,292 | B2* | 7/2022 | Osawa | H04W 52/367 |
| 11,528,734 | B2* | 12/2022 | Li | H04W 72/0446 |
| 11,825,511 | B2* | 11/2023 | Hosseini | H04W 72/569 |
| 11,917,560 | B2* | 2/2024 | Hosseini | H04W 52/40 |
| 12,028,284 | B2* | 7/2024 | Chen | H04L 5/0091 |
| 12,041,609 | B2* | 7/2024 | He | H04L 5/0064 |
| 12,120,678 | B2* | 10/2024 | Yang | H04L 5/0053 |
| 2017/0325174 | A1* | 11/2017 | Dinan | H04W 52/146 |
| 2018/0176922 | A1* | 6/2018 | Li | H04L 5/0032 |
| 2018/0310257 | A1* | 10/2018 | Papasakellariou | H04W 52/242 |
| 2019/0104476 | A1* | 4/2019 | Lim | H04W 52/146 |
| 2019/0182865 | A1* | 6/2019 | Falahati | H04W 74/004 |
| 2020/0221399 | A1* | 7/2020 | Hosseini | H04W 52/367 |
| 2023/0189167 | A1* | 6/2023 | Nimbalker | H04W 52/146 |

FOREIGN PATENT DOCUMENTS

| | | | | |
|---|---|---|---|---|
| EP | 4133805 | B1 * | 8/2023 | H04W 52/146 |
| EP | 4325947 | A2 * | 2/2024 | H04L 5/0032 |
| WO | 2018/194436 | | 10/2018 | |
| WO | WO-2018194436 | A1 * | 10/2018 | H04W 52/367 |

OTHER PUBLICATIONS

Apple Inc., "Uplink power control for NR-NR Dual Connectivity", 3GPP TSG-RAN WG1 #98bis, R1-1910977, Oct. 5, 2019, 4 sheets.

Intel Corporation, "Feature lead summary #2 for Uplink Power Control for Supporting NN-DC", 3GPP TSG RAN WG1#97, R1-1907891, May 17, 2019, 17 sheets.

Intel Corporation, "Feature lead summary on Uplink Power Control for Supporting NR-NR Dual-Connectivity", 3GPP TSG RAN WG1#96b, R1-1905839, Apr. 15, 2019, 5 sheets.

Qualcomm Incorporated, "Remaining issues on uplink power control for NR-DC", 3GPP TSG RAN WG1#100_e, R1-2000980, Feb. 15, 2020, 6 sheets.

Samsung, "Power Control for NR-DC", 3GPP TSG RAN WG1#100_e, R1-2000625, Feb. 14, 2020, 3 sheets.

Apple, "Feature lead summary on UL Power Control for NN-DC", 3GPP TSG-RAN WG1 Meeting #100-e, R1-2000846, Feb. 18, 2020, 7 sheets.

Apple, Outcome of email thread [100e-NR-LTE_NR_DC_CA_enh-ULPC-02], 3GPP TSG-RAN WG1 Meeting #100-e, R1-2001302, Mar. 6, 2020, 5 sheets.

Apple, "Feature lead summary #2 on UL Power Control for NN-DC", 3GPP TSG RAN WG1, R1-2001208, Feb. 24, 2020, 10 sheets.

* cited by examiner

| UE processing capability | SCS, u | $\Delta$ |
|---|---|---|
| Case 1 | Case 1 | $\Delta_1$ |
| Case 2 | Case 2 | $\Delta_2$ |
| Case 1 | Case 1 | $\Delta_3$ |
| Case 2 | Case 2 | $\Delta_4$ |

UPLINK POWER CONTROL FOR DUAL CONNECTIVITY

BACKGROUND

A user equipment (UE) may be equipped with dual connectivity (DC) functionality. Generally, there are two type of power sharing schemes that may be implemented by the UE for DC. One type of power sharing scheme may be referred to as semi-static power sharing (SPS). For SPS, the UE transmission power may be semi-statically split between a master cell group (MCG) and a secondary cell group (SCG). Another type of power sharing scheme may be referred to as dynamic power sharing (DPS). For DPS, the UE may dynamically adjust the UE transmission power in one cell group based on the transmission activity in another cell group.

SUMMARY

Some exemplary embodiments are related to a processor of a user equipment (UE) configured to perform operations. The operations include determining that a first uplink transmission is scheduled to overlap in time with a second uplink transmission based on a look ahead window, determining a first transmission power for the first uplink transmission, determining a second transmission power for the second uplink transmission based on the first transmission power for the first uplink transmission and performing the first uplink transmission and the second uplink transmission.

Other exemplary embodiments are related to a user equipment (UE) having a transceiver configured to communicate with a network and a processor communicatively coupled to the transceiver and configured to perform operations. The operations include determining that a first uplink transmission is scheduled to overlap in time with a second uplink transmission based on a look ahead window, determining a first transmission power for the first uplink transmission, determining a second transmission power for the second uplink transmission based on the first transmission power for the first uplink transmission and performing the first uplink transmission and the second uplink transmission.

Still further exemplary embodiments are related to a processor of a user equipment (UE) configured to perform operations. The operations include receiving an indication scheduling a first transmission on at least one symbol of a first slot on a first component carrier (CC) of a secondary cell group (SCG), determining that the first transmission is scheduled to overlap in time with a second transmission on a second CC of the SCG, determining whether at least one symbol of the first transmission or the second transmission are scheduled to overlap in time with at least one symbol on a CC of a master cell group (MCG) that is indicated as Uplink or Flexible, when the at least one symbol of the first transmission or the second transmission on the SCG are scheduled to overlap in time with at least one CC of the MCG that is indicated as "Uplink" or "Flexible", determining a first transmission power for the first transmission and a second transmission power for the second transmission based on a maximum transmission power parameter configured for the SCG and performing the transmission of the at least one symbol of the first slot.

DETAILED DESCRIPTION

The exemplary embodiments may be further understood with reference to the following description and the related appended drawings, wherein like elements are provided with the same reference numerals. The exemplary embodiments relate to uplink power control for dual connectivity (DC).

The exemplary embodiments are described with regard to a user equipment (UE). However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a next generation radio access network (NG-RAN) that supports DC to multiple nodes that each provide 5G new radio (NR) access, e.g., NR-NR DC. For example, the UE may be connected to a master node (MN) and a secondary node (SN) connected to one another via a non-ideal backhaul. However, any reference to a particular type of RAN, type of DC or type of node (e.g., cell, base station, etc.) is merely provided for illustrative purposes. The exemplary embodiments may apply to any appropriate DC configuration.

The exemplary embodiments relate to uplink power control. Generally, there are two types of power sharing schemes for uplink power control within the context of NR-NR DC, a semi-static power sharing (SPS) scheme and a dynamic power sharing (DPS) scheme. For SPS operation, the UE transmission power may be semi-statically split between a master cell group (MCG) and a secondary cell group (SCG). For DPS operation, the UE may dynamically adjust transmission power for one of the cell groups based on transmission activity in the other cell group.

As will be described in more detail below, the exemplary embodiments include various techniques for improving the flexibility and efficiency of SPS and DPS. The exemplary techniques may be used with other currently implemented SPS and DPS techniques, future implementations of SPS and DPS techniques or independently from other SPS and DPS techniques.

Figure 1:
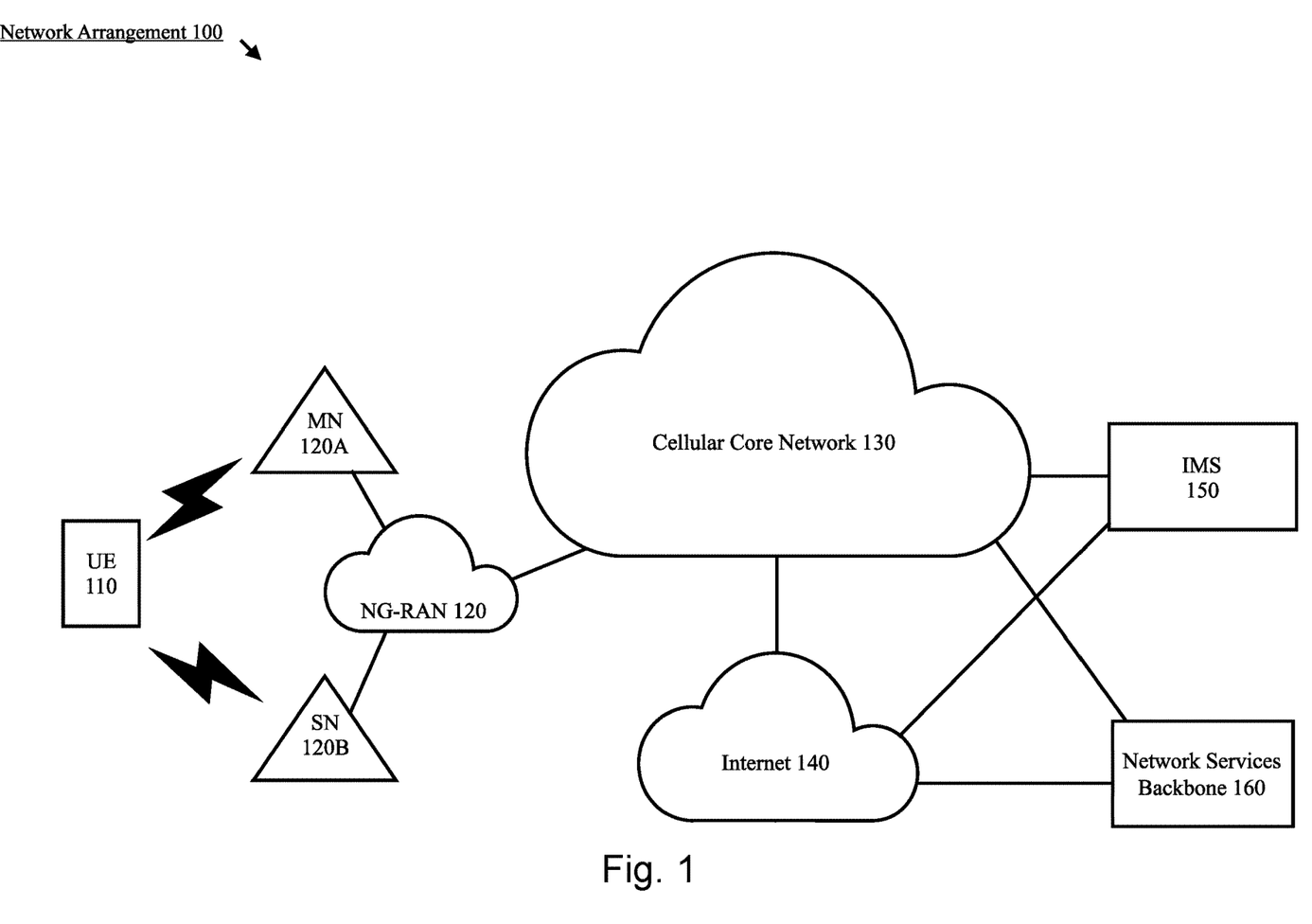
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a next generation radio access network (NG-RAN) 120. However, it should be understood that the UE 110 may also communicate with other types of networks (e.g. 5G cloud RAN, LTE-RAN, legacy cellular network, WLAN, etc.) and the UE 110 may also communicate with networks over a wired connection. With regard to the exemplary embodiments, the UE 110 may establish a connection with the NG-RAN 120. Therefore, the UE 110 may have a 5G NR chipset to communication with the NG-RAN 120.

The NG-RAN 120 may be a portion of a cellular network that may be deployed by a cellular provider (e.g., Verizon, AT&T, T-Mobile, etc.). The network 120 may include, for example, nodes, cells or base stations (Node Bs, eNodeBs, HeNBs, eNBS, gNBs, gNB distributed units (gNB-DU), gNB centralized units (gNB-CU), gNodeBs, macrocells, microcells, small cells, femtocells, etc.) that are configured to send and receive traffic from UEs that are equipped with the appropriate cellular chip set.

For DC, the UE 110 may connect to the NG-RAN 120 via a master node (MN) 120A and the secondary node (SN) 120B. The MN 120A and the SN 120B may be connected via a non-deal backhaul (not shown). Those skilled in the art will understand that the MN 120A may be one of multiple nodes that form a master cell group (MCG) and the SN 120B may be one of multiple nodes that form a secondary cell group (SCG). It will be further understood that any association procedure may be performed for the UE 110 to connect to the NG-RAN 120. For example, as discussed above, the NG-RAN 120 may be associated with a particular cellular provider where the UE 110 and/or the user thereof has a contract and credential information (e.g., stored on a SIM card). Upon detecting the presence of the NG-RAN 120, the UE 110 may transmit the corresponding credential information to associate with the NG-RAN 120. More specifically, the UE 110 may associate with a specific node, cell or base station. Once associated, the NG-RAN may configure a particular node as a MN and then configure the UE 110 with a SN to provide DC functionality. However, as mentioned above, the use of the NG-RAN 120 is for illustrative purposes and any appropriate type of RAN may be used.

In addition to the NG-RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
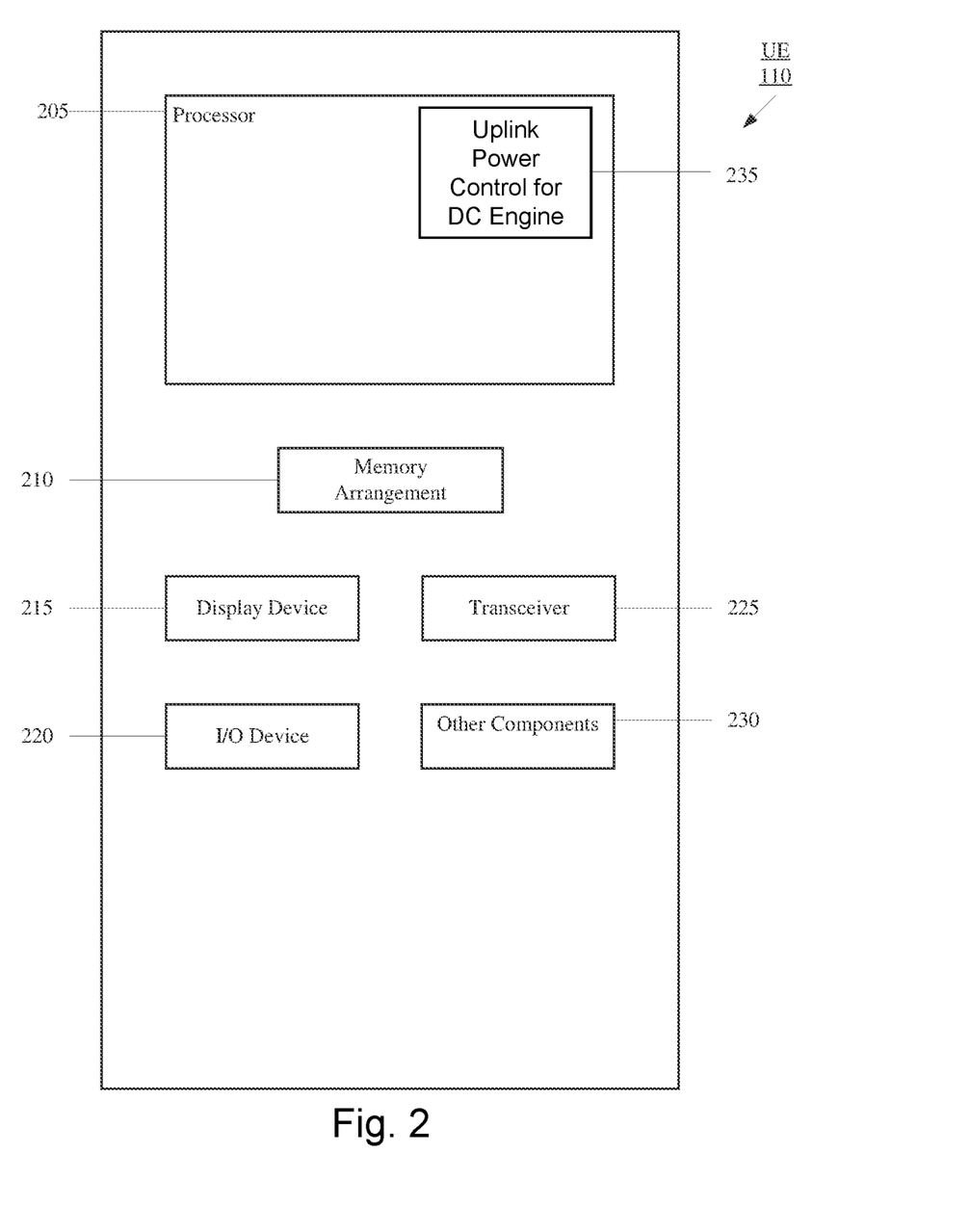
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an uplink power control for DC engine 235. The uplink power control for DC engine 235 may perform various operations related to a SPS scheme and a DPS scheme that is to be used for DC.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the NG-RAN 120. Accordingly, the transceiver 225 may operate on a variety of different frequencies or channels (e.g., set of consecutive frequencies).

As mentioned above, the exemplary embodiments relate to uplink power control for DC. In DC, the UE 110 may transmit signals to an MCG that includes at least the MN 120A using one or more component carriers (CCs). Similarly, the UE 110 may transmit signals to a SCG that includes at least the SN 120B using one or more CCs. The examples provided below will be described with regard to the uplink communications being transmitted over a physical uplink shared channel (PUSCH). However, reference to PUSCH is merely provided for illustrative purposes, the exemplary embodiments may apply to any appropriate uplink transmission over any appropriate channel.

In a first aspect, the exemplary embodiments relate to DPS. Various examples of exemplary DPS techniques will be described in more detail below with regard to FIGS. 3-5. In a second aspect, the exemplary embodiments relate to SPS. Various examples of exemplary SPS techniques will be described in more detail below with regard to FIGS. 7-8.

Figure 3:
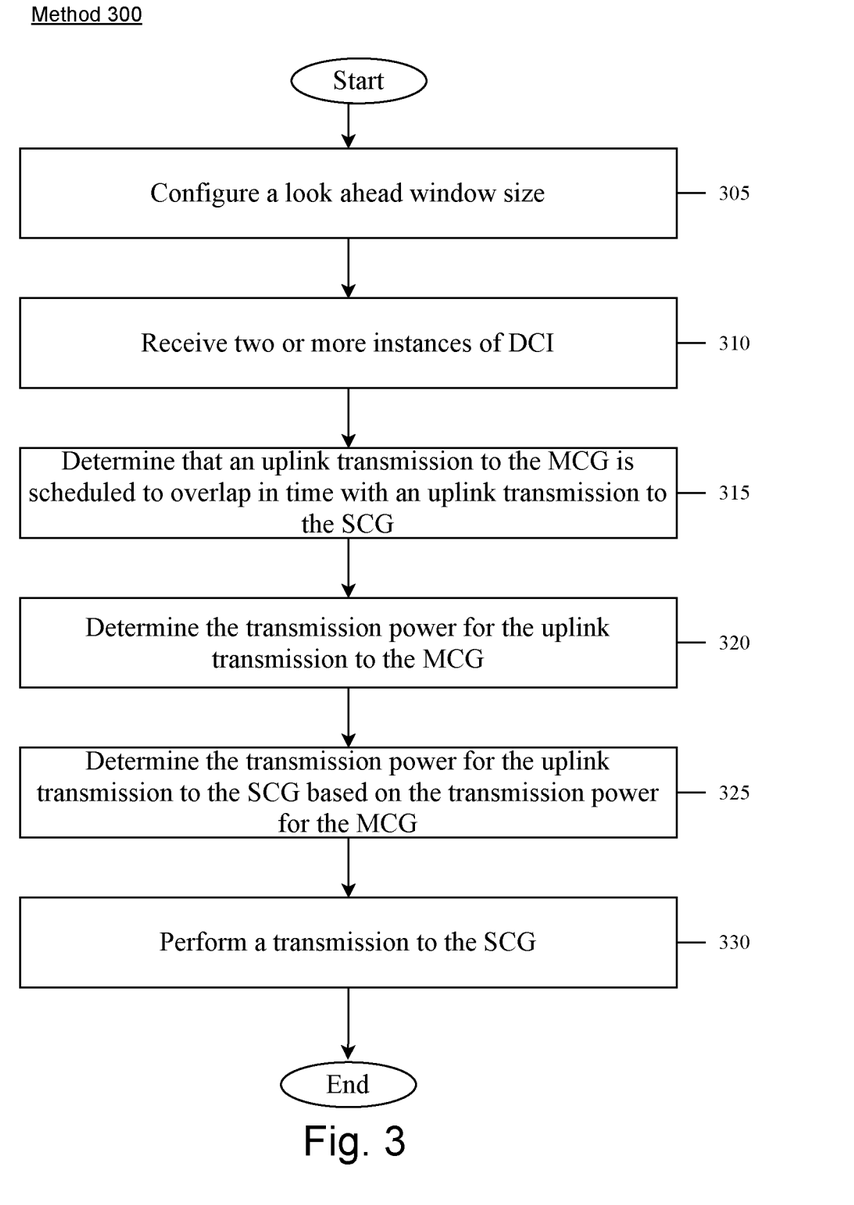
FIG. 3 shows a method for implementing look ahead window based DPS according to various exemplary embodiments.

FIG. 3 shows a method 300 for implementing look ahead window based DPS according to various exemplary embodiments. The method 300 will be described with regard to the UE 110 of FIG. 2 and the network arrangement 100 of FIG. 1.

Initially, consider the following exemplary scenario, the UE 110 is configured with DC and connected to an MCG and a SCG. The MCG includes at least the MN 120A and the SCG includes at least the SN 120B. There is at least one CC between the UE 110 and the MCG and there is at least one CC between the UE 110 and the SCG.

As will be explained in more detail below, for DPS, the UE 110 may determine the total transmission power on the SCG at the beginning of a transmission occasion on the SCG by determining the transmission power of overlapping transmissions on the MCG. The UE 110 may identify overlapping transmission by using a look ahead window.

In 305, the UE 110 configures a look ahead window size. The look ahead window may be used to identify overlapped transmissions across MCG and SCG. Throughout this description, the term "look ahead window" refers to a duration of time for each leading transmission among CCs on SCG during which the UE 110 monitors for downlink control information (DCI) on CCs of MCG that schedule a subsequent transmission on CCs of MCG. The DCI received on CCs of MCG during the look ahead window may be used by the UE 110 to identify overlapping transmissions between MCG and SCG and determine transmission powers of overlapping transmissions based on any of a variety of different rules which are described in more detail below. Those skilled in the art will understand that the UE 110 apply this look ahead window based power determination procedure once it is enabled with DPS scheme by UE-dedicated RRC signaling.

Figure 4:
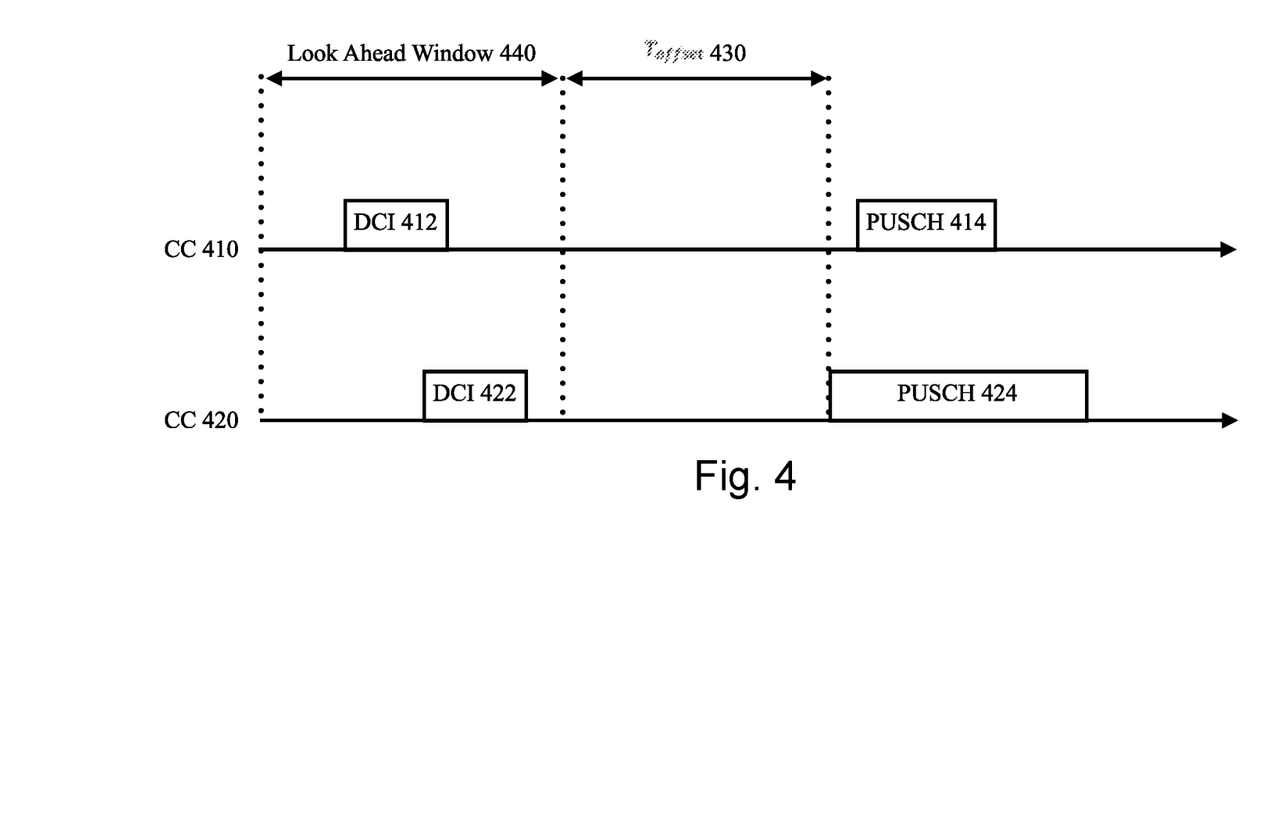
FIG. 4 illustrates an example of a look ahead window according to various exemplary embodiments.
Figure 5:
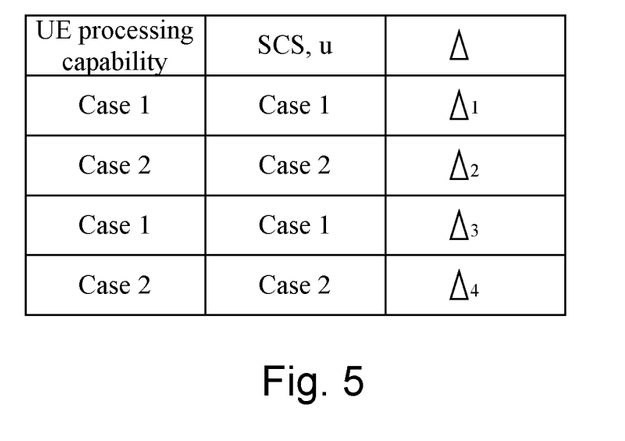
FIG. 5 shows a table for processing capability setup of MCG and SCG according to various exemplary embodiments.

FIG. 4 illustrates an example of a look ahead window according to various exemplary embodiments. This example includes a CC 410 corresponding to the MCG over which the UE 110 receives DCI 412 that schedules PUSCH 414. This example also includes a CC 420 corresponding to the SCG over which the UE 110 receives DCI 422 that schedules PUSCH 424. The beginning of the PUSCH 424 may provide the basis for the time offset ($T_{offset}$) 430. $T_{offset}$ 430 may provide the basis for the determination of ook ahead window 440 for PUSCH 424.

The look ahead window 440 and/or the $T_{offset}$ 430 may be configured in any of a variety of different ways. As indicated above, in this example, the look ahead window 440 is defined as a duration of time with a last symbol that is earlier than $T_{offset}$ 430 symbols from the beginning of the transmission occasion on the SCG (e.g., PUSCH 424). Other examples of how the look ahead window 440 and/or the $T_{offset}$ 430 may be configured will be provided below after the description of the method 300.

Returning to the method 300, in 310, the UE 110 receives two or more instances of DCI (e.g., DCI 412, DCI 422) that are transmitted within the look ahead window 440. In 315, the UE 110 determines that an uplink transmission to the MCG (e.g., PUSCH 414) is scheduled to overlap in time with an uplink transmission to the SCG (e.g., PUSCH 424) based on the values of time domain resource allocation (TDRA) in the received DCI 412, 422. In 320, the UE 110 determines the transmission power for the uplink transmission to the MCG. The UE 110 may determine the transmission power for the uplink transmission to the MCG in any of a variety of different ways. For example, the DCI 412 may include various reference signals. The UE 110 may determine the transmission power based, at least in part, on parameters derived from the reference signals. In other designs, the transmission power of PUSCH 414 may be determined based on the information provided by DCI format 412, e.g., MSC, allocated resource blocks etc. The exemplary embodiments are not limited to determining the transmission power for the uplink transmission to the MCG in any particular manner and may apply to determining this uplink transmission power in any appropriate manner.

In 325, the UE 110 determines the transmission power for the uplink transmission to the SCG based, at least in part, on the transmission power for the uplink transmission to the MCG. This may be done to ensure that the total transmission power does not exceed the maximum power class of the UE 110. Thus, the UE 110 may dynamically determine the transmission power to use for the SCG based on the transmission power that is to be used for the overlapped transmissions on MCG.

In 330, the UE 110 may perform the transmission to the SCG. For example, the UE 110 may transmit on the PUSCH 424 using the transmission power determined in 325. Those skilled in the art will understand the operations performed by the UE 110 to generate a transmission and output the signal over the air to the SCG using the determined transmission power. Subsequently, the method 300 ends.

As mentioned above, the look ahead window 440 and/or the $T_{offset}$ 430 may be configured in any of a variety of different ways. In some embodiments, $T_{offset}$ 430 may be determined based on the processing time defined for all of the CCs within the MCG and/or the processing time defined for all of the CCs within the SCG corresponding to a reference subcarrier spacing (SCS). This ensures that that the value of $T_{offset}$ 430 is able to account for two sequential computations, e.g., i) decoding the DCI that scheduled the PUSCH on the MCG and ii) determining the transmission power for the PUSCH on the SCG. Since parameters may vary between synchronous DC operation and asynchronous DC operation, different values for $T_{offset}$ 430 may be used based on whether synchronous DC operation or asynchronous DC operation is configured.

The UE 110 may utilize any of a variety of different techniques to determine the reference SCS. A first technique includes selecting the smallest SCS among the CCs within a respective cell group (e.g. MCG or SCG). A second technique includes selecting the smallest SCS among the active bandwidth parts (BWPs) of CCs within a respective cell group (e.g., MCG or SCG). A third technique includes utilizing the reference SCS configured by radio resource control (RRC) signaling and may vary on a per UE basis. A fourth technique includes utilizing the preconfigured reference SCS. For example, different SCS values may be defined for frequency range 1 (FR1) and FR2.

In other embodiments, $T_{offset}$ 430 may be determined based on $T_{offset}=\max(T_{proc,MCG}^{max}, T_{proc,SCG}^{max})$. Here, $T_{proc,MCG}^{max}$ represents the maximum UE 110 processing time among any of the possible values from $T_{proc,2}$, $T_{proc,CSI}$, $T_{proc,release}^{max}$, $T_{proc,2}^{max}$ and $T_{proc,SCI}^{max}$ as specified in technical specification (TS) 38.213 v. 15.0 and (TS) 38.214 v. 15.0 based on the reference SCS for MCG. Similarly, $T_{proc,SCG}^{max}$ represents the maximum UE 110 processing time among any of the possible values from $T_{proc,2}$, $T_{proc,CSI}$, $T_{proc,release}^{max}$, $T_{proc,2}^{max}$ and $T_{proc,SCI}^{max}$ as specified in technical specification (TS) 38.213 v. 15.0 and (TS) 38.214 v. 15.0 based on the reference SCS for SCG.

In some embodiments, a value for $T_{offset}$ 430 may be based on the DPS mode. For DPS mode-1, $T_{offset}=\max(T_{proc,MCG}^{max}, T_{proc,SCG}^{max})$. Here, $T_{proc,MCG}^{max}$ represents the maximum UE 110 processing time among any of the possible values from $T_{proc,2}$, $T_{proc,CSI}$, $T_{proc,release}^{mux}$, $T_{proc,2}^{mux}$ and $T_{proc,SCI}^{mux}$ as specified in technical specification (TS) 38.213 v. 15.0 and (TS) 38.214 v. 15.0 on the reference SCS for MCG. Similarly, $T_{proc,SCG}^{max}$ represents the maximum UE 110 processing time among any of the possible values from $T_{proc,2}$, $T_{proc,CSI}$, $T_{proc,release}^{mux}$, $T_{proc,2}^{mux}$ and $T_{proc,SCI}^{mux}$ specified in technical specification (TS) 38.213 v. 15.0 and (TS) 38.214 v. 15.0 based on the reference SCS for SCG. For DPS mode-2, $T_{offset}=\max(T_{proc,MCG}^{max}, T_{proc,SCG}^{max})$. Here, $T_{proc,MCG}^{max}$ represents the maximum UE 110 processing time among any of the possible values from $T_{proc,2}$, $T_{proc,CSI}$, $T_{proc,release}^{mux}$ and $T_{proc,2}^{mux}$ as specified in technical specification (TS) 38.213 v. 15.0 and (TS) 38.214 v. 15.0 based on the reference SCS for MCG. Similarly, $T_{proc,SCG}^{max}$ represents the maximum UE 110 processing time among any of the possible values from $T_{proc,2}$, $T_{proc,CSI}$, $T_{proc,release}^{mux}$ and $T_{proc,2}^{mux}$ as specified in technical specification (TS) 38.213 v. 15.0 and (TS) 38.214 v. 15.0 based on the reference SCS for SCG. The difference between DPS mode-1 and DPS mode-2 is that DPS mode-2 does not consider $T_{proc,SCI}^{mux}$. The UE 110 may indicate its support of DPS mode-1 or DPS mode-2 using UE 110 capability information.

Under conventional circumstances, if aperiodic channel state information (CSI) feedback on the MCG is triggered for the MCG, a scenario may arise in which the UE 110 determines that the SCG transmission power prior to the MCG transmission power determination. Thus, if aperiodic CSI feedback is triggered by the DCI on the MCG, the UE 110 may determine the maximum transmission power on the MCG based on the allocated transmission power of overlapped SCG transmissions. For example, the UE 110 may reduce the transmission power in any portion of a transmission duration on MCG in this type of scenario so that the total transmission power of the MCG and the SCG in any portion does not exceed the maximum transmission power. Therefore, in contrast to the example provided in the method 300, the MCG transmission power may be determined based on the SCG transmission power.

In some embodiments, specific values of $T_{offset}$ 430 may be preconfigured. For example, a first value of $T_{offset}=4$ millisesonds (ms) and a second value of $T_{offset}=1.5$ ms. The UE 110 may be preconfigured to support either the first value or the second value. Using preconfigured values allows the UE 110 to indicate its capability to the network during initial access.

In other embodiments, the UE 110 may be preconfigured with a first value for $T_{offset}$ 430 that is to be used for synchronous DC within the context of NR-NR DC and a second value, larger than the first value, that is to be used for asynchronous DC within the context of NR-NR DC. The second larger value may be represented by $T_{offset}^2 = K*T_{offset}^1+\delta$ where $T_{offset}^1$ represents the first value that is to be used for synchronous DC, $\delta$ is a preconfigured value (e.g., 1 ms or 2 ms) and K is a scaling factor (e.g., 2 or 1.5)

In some embodiments, a value for $T_{offset}$ 430 may be based on the following equation: $T_{offset}=T_{proc,MCG}^{max}+\Delta$. Here, $T_{proc,MCG}^{max}$ represents the maximum UE 110 processing time among any of the possible values $T_{proc,2}$, $T_{proc,CSI}$, $T_{proc,release}^{mux}$, $T_{proc,2}^{mux}$ and $T_{proc,CSI}^{mux}$ as specific in technical specification (TS) 38.213 v. 15.0 and (TS) 38.214 v. 15.0 based on the reference SCS for MCG. There may be two values for $\Delta$, e.g., $\Delta_1$ and $\Delta_2$. The UE 110 may be preconfigured to use $\Delta_1$ or $\Delta_2$ based on UE 110 time processing requirements. During operations, the UE 110 may indicate whether it supports $\Delta_1$ or $\Delta_2$ using 1-bit RRC signaling. A single $\Delta$ or a paired $\Delta_1$ or $\Delta_2$ may be determined based on SCS and the UE 110 processing capability setup of MCG and SCG using the table 500 of FIG. 5. In the table 500, case 1 represents same or lower SCS or processing time on MCG and case 2 represents higher SCS or processing time on MCG.

Figure 6:
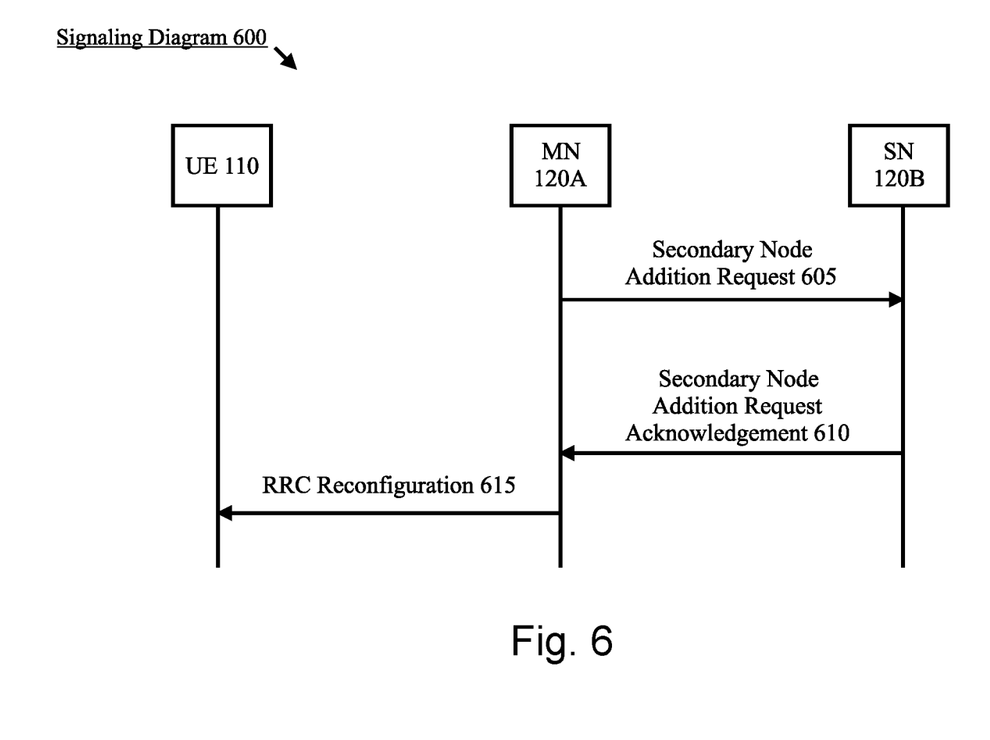
FIG. 6 shows a signaling diagram for inter-node signaling for look ahead determination according to various exemplary embodiments.

FIG. 6 shows a signaling diagram 600 for inter-node signaling for look ahead determination according to various exemplary embodiments. The signaling diagram 600 includes the UE 110, the MN 120A and the SN 120B.

In 605, the MN 120A transmits a secondary node addition request to the secondary node 120B. Those skilled in the art will understand the contents and the format of the secondary node addition request.

In 610, the SN 120B transmits a secondary node addition request acknowledgement. This message may also include an indication of a set of parameters such as SCS configuration, processing time configuration and information related to $d_{1,1}$ and $d_{2,2}$. The parameters may be sent to the MN 120A in a multi-radio DC (MR-DC) container. In some embodiments, the SCS configuration may be for each BWP of each serving cell in the SCG. In other embodiments, the smallest SCS across all BWPs of all configured CCs on SCG. The processing time configuration may indicate capability 1 or capability 2 for each CC or at least one CC of the SCG. The value of $d_{2,2}$ depends on whether BWP switching is configured to operate on SCG CCs. The maximum value of $d_{1,1}$ depends on whether physical downlink shared channel (PDSCH) symbols are less than 7 will be applies on SCG CCs.

In 615, the MN 120A sends an RRC reconfiguration message to the UE 110. The RRC reconfiguration information may enable the UE 110 to establish a connection to the SN 120B. Various parameters may be relayed to the UE 110 in this message. In some embodiments, the parameters relayed to the UE 110 may be used by the UE 110 to determine $T_{offset}$ 430.

As indicated above, the UE 110 may be configured to indicate to the network whether the UE 110 supports DPS for synchronous DC operation and/or asynchronous DC operation. For example, the UE 110 may provide UE capability information via 1-bit RRC signaling or any other appropriate type of message indicating whether or not the UE 110 supports DPS for asynchronous DC operation and/or synchronous DC operation.

Figure 7:
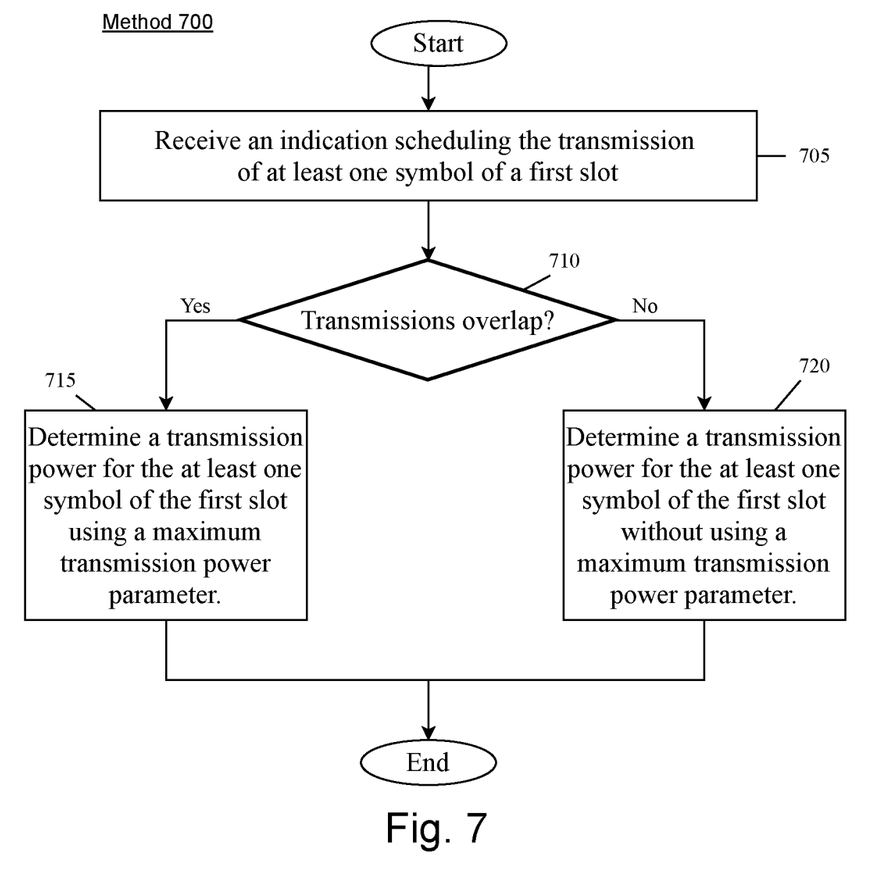
FIG. 7 shows a method for a semi-static power sharing (SPS) scheme according to various exemplary embodiments.

In a second aspect, the exemplary embodiments relate to implementing exemplary SPS techniques. FIG. 7 shows a method 700 for a semi-static power sharing scheme (SPS) according to various exemplary embodiments.

In 705, the UE 110 receives an indication scheduling the transmission of at least one symbol of a first slot. For example, the UE 110 may receive an RRC signal indicating that at least one symbol of a first slot of the MCG or the SCG is scheduled for the uplink or flexible.

In 710, the UE 110 determines whether the at least one symbol of the first slot overlaps in time with an ongoing transmission. For example, the UE 110 may determine that the at least one symbol of the first slot overlaps with at least one symbol of a second slot of the SCG or the MCG. If an overlap is identified, the method 700 continues to 715.

In 715, the UE 110 determines a transmission power for the at least one symbol of the first slot using a maximum transmission power parameter. The maximum transmission power parameters corresponding to each cell group (e.g., $P_{SCG}$ or $P_{MCG}$) may be indicated by RRC signaling. Returning to 710, if there is no overlap, the method 700 continues to 720.

In 720, the UE 110 determines a transmission power for the at least one symbol of the first slot without using the maximum transmission parameters. An exemplary scenario for the SPS scheme of the method 700 is shown below in FIG. 8.

Figure 8:
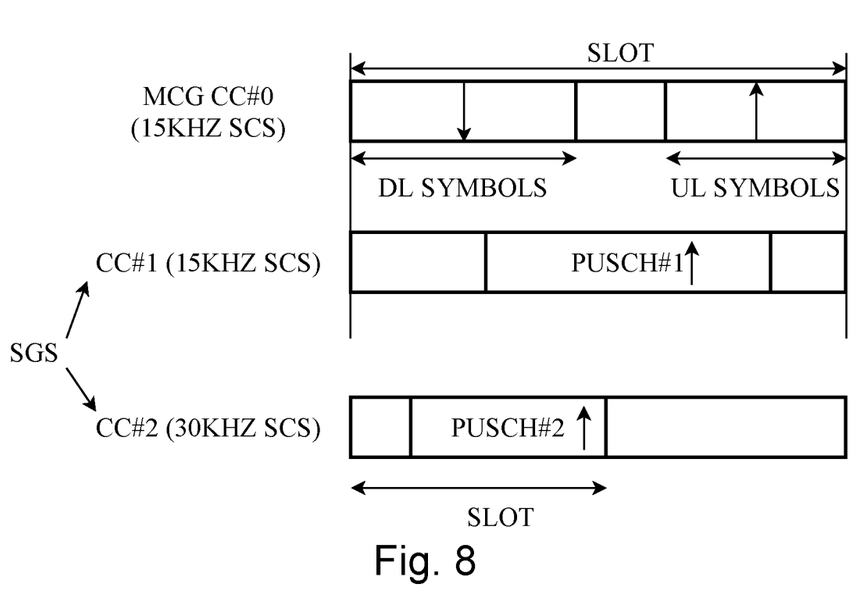
FIG. 8 shows an exemplary scenario related to the SPS scheme when there are overlapping slots in component carriers (CCs) according to various exemplary embodiments.

FIG. 8 shows an exemplary scenario related to the SPS when there are overlapping slots in CCs according to various exemplary embodiments. In this example, the SCS is 15 kilohertz (kHz) for the CC #0 of the MCG and CC #1 of the SCG. Further, the SCS is 30 kHz for the CC #2 of the SCG.

In accordance with the SPS scheme described above in the method 700, the total transmission power of PUSCH #1 and PUSCH #2 are limited by the maximum transmission power parameter $P_{SCG}$ because PUSCH #1 is partially overlapped with uplink symbols on CC #0 of the MCG. Even though there is no overlap between the PUSCH #2 on CC2 and uplink symbols on CC #0, PUSCH #2 may still be limited by the transmission power parameter $P_{SCG}$. This may be done to avoid transmission power variance in the middle of the PUSCH #1 transmission when PUSCH #2 transmission ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations, comprising:
generating, for transmission to a network, capability information for dynamic power sharing (DPS) the capability information comprising an indication that the UE supports one of a first DPS mode and a second DPS mode;
determining that a first uplink transmission is scheduled to overlap in time with a second uplink transmission based on a look ahead window, wherein the lookup window is based on an offset parameter that is based on max ($T_{proc,MCG}^{max}$, $T_{proc,SCG}^{max}$) and when the capability information indicates that the UE supports the first DPS mode $T_{proc,MCG}^{max}$ represents a maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference subcarrier spacing, SCS, for a master cell group, MCG, and $T_{proc,SCG}^{max}$ represents the maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference SCS for the secondary cell group, SCG, and when the capability information indicates that the UE supports the second DPS mode $T_{proc,MCG}^{max}$ represents the maximum processing time among any possible value from $T_{proc,2}$, $T_{proc,release}^{mux}$ and $T_{proc,2}^{mux}$ based on the reference SCS for the MCG and $T_{proc,SCG}^{max}$ represents the maximum processing time among any possible value from $T_{proc,2}$, $T_{proc,release}^{mux}$ and $T_{proc,2}^{mux}$ based on the reference SCS for the SCG;
determining a first transmission power for the first uplink transmission;
determining a second transmission power for the second uplink transmission based on the first transmission power for the first uplink transmission; and
performing the first uplink transmission and the second uplink transmission.

2. The processor of claim 1, wherein the first uplink transmission is to the MCG and the second uplink transmission is to the SCG.

3. The processor of claim 1, wherein the offset parameter is relative to a first symbol of the second uplink transmission.

4. The processor of claim 1, wherein the first uplink transmission is to the SCG and the second uplink transmission is to the MCG,
wherein the second uplink transmission is a periodic channel state information (CSI) feedback.

5. A user equipment (UE), comprising:
a transceiver configured to communicate with a network; and
a processor communicatively coupled to the transceiver and configured to perform operations, comprising:
generating, for transmission to a network, capability information for dynamic power sharing (DPS) the capability information comprising an indication that the UE supports one of a first DPS mode and a second DPS mode;
determining that a first uplink transmission is scheduled to overlap in time with a second uplink transmission based on a look ahead window, wherein the lookup window is based on an offset parameter that is based on max ($T_{proc,MCG}^{max}$, $T_{proc,SCG}^{max}$) and when the capability information indicates that the UE supports the first DPS mode $T_{proc,MCG}^{max}$ represents a maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference subcarrier spacing, SCS, for a master cell group, MCG, and $T_{proc,SCG}^{max}$ represents the maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference SCS for the secondary cell group, SCG, and when the capability information indicates that the UE supports the second DPS mode $T_{proc,MCG}^{max}$ represents the maximum processing time among any possible value from $T_{proc,2}$, $T_{proc,release}^{mux}$ and $T_{proc,2}^{mux}$ based on the reference SCS for the MCG and $T_{proc,SCG}^{max}$ represents the maximum processing time among any possible value from $T_{proc,2}$, $T_{proc,release}^{mux}$ and $T_{proc,2}^{mux}$ based on the reference SCS for the SCG;

determining a first transmission power for the first uplink transmission;

determining a second transmission power for the second uplink transmission based on the first transmission power for the first uplink transmission; and performing the first uplink transmission and the second uplink transmission.

6. The UE of claim 5, wherein the first uplink transmission is to the MCG and the second uplink transmission is to the SCG.

7. The UE of claim 5, wherein the offset parameter is relative to a first symbol of the second uplink transmission.

8. The UE of claim 5, wherein the first uplink transmission is to the SCG and the second uplink transmission is to the MCG, wherein the second uplink transmission is a periodic channel state information (CSI) feedback.

9. An apparatus comprising processing circuitry coupled to a memory, the processing circuitry configured to:

generate, for transmission to a network, capability information for dynamic power sharing (DPS) the capability information comprising an indication that the UE supports one of a first DPS mode and a second DPS mode;

determine that a first uplink transmission is scheduled to overlap in time with a second uplink transmission based on a look ahead window, wherein the lookup window is based on an offset parameter that is based on max ($T_{proc,MCG}^{max}$, $T_{proc,SCG}^{max}$) and when the capability information indicates that the UE supports the first DPS mode $T_{proc,MCG}^{max}$ represents a maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference subcarrier spacing, SCS, for a master cell group, MCG, and $T_{proc,SCG}^{max}$ represents the maximum processing time among any possible value from $T_{proc,2}$, $T_{proc,CSI}$, $T_{proc,release}^{mux}$, $T_{proc,2}^{mux}$ and $T_{proc,CSI}^{mux}$ based on a reference SCS for the secondary cell group, SCG, and when the capability information indicates that the UE supports the second DPS mode $T_{proc,MCG}^{max}$ represents the maximum processing time among any possible value from $T_{proc,2}$, $T_{proc,release}^{mux}$ and $T_{proc,2}^{mux}$ based on the reference SCS for the MCG and $T_{proc,SCG}^{max}$ represents the maximum processing time among any possible value from $T_{proc,2}$, $T_{proc,release}^{mux}$ and $T_{proc,2}^{mux}$ based on the reference SCS for the SCG;

determine a first transmission power for the first uplink transmission;

determine a second transmission power for the second uplink transmission based on the first transmission power for the first uplink transmission; and perform the first uplink transmission and the second uplink transmission.

10. The apparatus of claim 9, wherein the first uplink transmission is to the MCG and the second uplink transmission is to the SCG.

11. The apparatus of claim 9, wherein the offset parameter is relative to the first symbol of the second uplink transmission.

12. The apparatus of claim 9, wherein the first uplink transmission is to the SCG and the second uplink transmission is to the MCG, wherein the second uplink transmission is a periodic channel state information (CSI) feedback.

* * * * *